Patented Dec. 6, 1938

2,139,102

UNITED STATES PATENT OFFICE 2,139,102

GERMICIDAL AGENT

Karl T. Steik and Julius F. Muller, Upper Montclair, N. J., assignors to National Oil Products Company, Harrison, N. J.

No Drawing. Application June 29, 1934,
Serial No. 732,998

4 Claims. (Cl. 167—53.1)

Our invention relates to germicides and refers particularly to germicidal agents particularly adapted for the destruction of the coccidia oocysts.

Coccidiosis is a disease of poultry attacking principally chickens, although it is found frequently among pigeons and turkeys and occasionally among ducks and geese. All species of birds are susceptible at all ages, although it is most serious among the younger stock.

Coccidiosis is caused by a microscopic protozoan (animal) parasite genus Eimeria, several species being known. The point of attack is some portion of the intestine, the exact location depending primarily upon the species of coccidia.

The mode of infection is by mouth. The bird picks up the dormant form of the parasite, known as the oocyst, with feed or water from infected surfaces. Passing through the fore part of the digestive tract, the oocyst lodges in the intestine, the cyst wall is softened and four small oval bodies known as sporoblasts are released. From each sporoblast, two comma-shaped bodies known as sporozoites are released. These enter the epithelial cells of the intestinal lining. Asexual multiplication or schizogony then takes place within the host cell.

After several cycles of schizogony, the sexual stages take form, microgametocytes and macrogametocytes being formed. Fertilization of the macrogamete (female cell) by the male microgamete takes place within the host cell. The result of this union is an oocyst which then leaves the host cell and is eliminated from the bird's body with the intestinal discharge.

The oocyst as passed from the bird is noninfective. It is an oval shaped body having a tough outer wall, and varying in size from 25 to 35 microns in length and 15 to 20 microns in breadth. The interior appears as a grey granular mass. Under favorable conditions of moisture, temperature, and oxygen supply, in forty-eight hours this mass contracts to a sphere, and then divides into the four sporocysts and these each form two sporozoites within themselves. This transition is known as sporulation. The oocysts are then highly infective. The time of the complete life cycle depends upon the species of coccidia, ranging from seven to ten days.

The effect of the disease on the bird is destruction of the mucous lining of the intestine resulting in heavy mortality, or at least great loss of vitality and stunting of growth. The greatest mortality occurs in flocks or chicks just past brooder age, that is about ten weeks of age.

Adult birds are more susceptible to a chronic infection which reduces vigor and cuts down egg production. It is one of the most serious of poultry diseases and causes great losses every year and few poultry farms escape its ravages.

Due to the fact that the organism buries itself within the cells of the intestinal mucosa, internal treatment is of little benefit. The external or oocyst form is the logical point of attack. However, its outer covering is tough and very resistant, and none of the commonly used disinfectant agents are effective in killing this stage.

As the oocysts are spread over the ground, or poultry yard, in admixture with large quantities of organic matter, it is evident that an effective germicide should be one which will not exert its strength upon such organic matter and in which the maximum germicidal reaction will be effective upon the oocysts and the germicides of our invention possess these and other valuable properties.

We have found that a solution or an emulsifiable solution of sulphur dioxide possesses exceedingly strong germicidal properties for the destruction of oocysts, and because of its stability and the fact that its germicidal properties are not exerted, nor exerted only in small part, upon the organic matter in which the oocysts are found, the composition of our invention has valuable properties not present in the present employed compositions for this purpose.

Where it is desirable that the solvent for the sulphur dioxide should not evaporate rapidly in order that the solution may remain in contact with the oocysts for a considerable length of time, we have found that oil solvents for the sulphur dioxide are preferable, as for instance mineral oils, vegetable oils such as castor oil, olive oil, linseed oil &c., and animal oils such as fish oils, lard oil, whale oil &c.

Where it is desirable that the solvent should evaporate rapidly, organic solvents such as hexalene, tetralene, carbon tetrachloride, chloroform, cyclohexane, &c may be used.

While a solution of sulphur dioxide in the classes of solvents above mentioned may be employed for killing oocysts, we prefer to employ emulsifiable oils of these classes, as when mixed with water a more perfect spraying effect may be obtained.

Since sulphur dioxide is an acid anhydride and with water forms sulphurous acid, the emulsifier has to be such that its emulsifying power will not be affected by this acid. We have found that the so-called mahogany mineral oil sulphonates are suitable for this purpose. About 5% of mahogany soaps of good grade is sufficient to produce satisfactory emulsions.

Following is a detailed description for carrying out the invention. A 5% solution of dry mahogany soaps in a mineral oil like the 28° paraffin oil is made at first. Into this oil sulphur dioxide gas is bubbled until the oil contains about 2% of it. Such an oil can be kept in ordinary tin cans. Higher concentrations of sulphur dioxide may also be made in suitable containers.

For use this solution is diluted and emulsified with water to the extent that it would contain about 0.3% of sulphur dioxide.

The paraffin oil mentioned above may be replaced by other mineral oils, animal oils or vegetable oils.

The mahogany soap may be replaced by other emulsifying agents suitable for emulsifying the particular oils employed.

Exhaustive experiments with the germicidal agents suggested for the killing of oocysts gave the following results:

One-tenth percent bichloride of mercury killed only 18% of the oocysts exposed to it for 48 hours. It required a 1% solution to kill 100% in 48 hours. Eight per cent caustic soda killed only 1.1% in 48 hours, 8% hydrochloric acid killed only 4.5% in 48 hours, 4% chlorazene killed none, 5% formol killed 40% in 48 hours. Five per cent cresol required 8 hours to kill 100% and 2% phenol required 48 hours to kill 100%. A highly unsaturated petroleum oil killed none of the oocsyts in 1½ hours, 10% sodium phenolate killed only 25% in 1 hour, and a highly potent pine oil disinfectant killed only 5% in 4 hours. A 5% suspension of collodial iodine kills 100% of the oocysts in 1 hour or less. This material, however, is extremely unstable in the presence of organic matter. A 10% solution of cresols in a light petroleum fraction requires 5 to 8 hours to kill 100%. This is highly inflammable and corrosive in action.

The product herewith described, on the other hand, kills 100% of the oocysts in five minutes when used undiluted, and 100% in 20 minutes diluted with 4 parts of water. It is unaffected by organic matter, is non-poisonous, and non-inflammable. Its potency is revealed by the fact that it may be diluted with several volumes of water and still remain quickly effective.

It will thus be seen that the composition of our invention possesses most valuable properties for the destruction of oocysts.

We do not limit ourselves to the particular quantities, materials or steps of procedure particularly mentioned as these are given simply for the purpose of describing our invention.

What we claim is:

1. A composition for destroying coccidia oocysts comprising sulphur dioxide dissolved in an oil.

2. A composition for destroying coccidia oocysts comprising sulphur dioxide dissolved in mineral oil.

3. An emulsifiable composition for destroying coccidia oocysts comprising mineral oil having sulphur dioxide dissolved therein and a mahogany soap.

4. An emulsion of the oil-in-water type for destroying coccidia oocysts, the oil phase comprising mineral oil having sulphur dioxide dissolved therein and a mahogany soap.

KARL T. STEIK.
JULIUS F. MULLER.